United States Patent
Liu et al.

(10) Patent No.: US 10,067,367 B2
(45) Date of Patent: Sep. 4, 2018

(54) LIGHT GUIDE PLATE, BACKLIGHT MODULE AND LIQUID CRISTAL DISPLAY DEVICE

(71) Applicants: BOE Technology Group Co., Ltd., Beijing (CN); Beijing BOE Optoelectronics Technology Co., Ltd., Beijing (CN)

(72) Inventors: Yufei Liu, Beijing (CN); Changchun Wei, Beijing (CN); Wenfeng Jin, Beijing (CN); Ming Zhai, Beijing (CN); Hyungkyu Kim, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 207 days.

(21) Appl. No.: 14/906,121

(22) PCT Filed: Jun. 26, 2015

(86) PCT No.: PCT/CN2015/082489
§ 371 (c)(1),
(2) Date: Jan. 19, 2016

(87) PCT Pub. No.: WO2016/086653
PCT Pub. Date: Jun. 9, 2016

(65) Prior Publication Data
US 2016/0327733 A1     Nov. 10, 2016

(30) Foreign Application Priority Data
Dec. 3, 2014    (CN) .......................... 2014 1 0729178

(51) Int. Cl.
*G02F 1/1333*    (2006.01)
*F21V 8/00*    (2006.01)

(52) U.S. Cl.
CPC ..... *G02F 1/133308* (2013.01); *G02B 6/0088* (2013.01); *G02B 6/009* (2013.01);
(Continued)

(58) Field of Classification Search
CPC ... G02F 1/133308; G02F 2001/133314; G02F 2001/13317; G02B 6/0088
See application file for complete search history.

(56) References Cited

U.S. PATENT DOCUMENTS 7,760,288 B2* 7/2010 Yuan ................. G02F 1/133608
349/58
8,045,128 B2* 10/2011 Kim ................. G02F 1/133608
349/158

(Continued)

FOREIGN PATENT DOCUMENTS

CN    101046579 A    10/2007
CN    101165563 A    4/2008

(Continued)

OTHER PUBLICATIONS

Oct. 8, 2015—(WO)—International Search Report and Written Opinion Appn PCT/CN2015/082489 with English Tran.

(Continued)

*Primary Examiner* — Dung Nguyen
(74) *Attorney, Agent, or Firm* — Banner & Witcoff, Ltd.

(57) ABSTRACT

A light guide plate, a backlight module, a liquid crystal display module and a liquid crystal display device are disclosed. The light guide plate comprises a light-guide-plate body and a protecting frame. The light-guide-plate body comprises a light-exiting surface and a light-transmitting surface that are opposite to each other, and a plurality of side surfaces connecting the light-exiting surface with the light-transmitting surface. The protecting frame comprises a vertical wall and a horizontal wall extending from the (Continued)

vertical wall to an inner side of the protecting frame. The horizontal wall comprises a first contact surface which is attached to an edge of the light-exiting surface. The vertical wall comprises a second contact surface which is connected with the first contact surface, and the second contact surface is attached to side surfaces of the light-guide-plate body.

17 Claims, 6 Drawing Sheets

(52) U.S. Cl.
CPC .......... *G02B 6/0036* (2013.01); *G02B 6/0055* (2013.01); *G02B 6/0065* (2013.01); *G02F 2001/133314* (2013.01); *G02F 2001/133317* (2013.01)

(56) References Cited

U.S. PATENT DOCUMENTS

| 9,482,812 B2* | 11/2016 | Que | G02B 6/0088 |
| 2002/0093811 A1* | 7/2002 | Chen | G01D 11/28 |
| | | | 362/633 |

FOREIGN PATENT DOCUMENTS

| CN | 101295098 A | 10/2008 |
| CN | 101493213 A | 7/2009 |
| CN | 101936509 A | 1/2011 |
| CN | 102147078 A | 8/2011 |
| CN | 102193245 A | 9/2011 |
| CN | 102759080 A | 10/2012 |
| CN | 103411165 A | 11/2013 |
| CN | 103511918 A | 1/2014 |
| CN | 104360541 A | 2/2015 |
| JP | 201380583 A | 5/2013 |

OTHER PUBLICATIONS

Aug. 29, 2016—(CN)—First Office Action Appn 201410729178.X with English Tran.
Apr. 12, 2017—(CN) Third Office Action Appn 201410729178.X with English Tran.
Dec. 9, 2016—(CN) Second Office Action Appn 201410729178.X with English Tran.

* cited by examiner

LIGHT GUIDE PLATE, BACKLIGHT MODULE AND LIQUID CRISTAL DISPLAY DEVICE

TECHNICAL FIELD

Embodiments of the present invention relate to a light guide plate, a backlight module and a liquid crystal display device.

BACKGROUND

Figure 1:
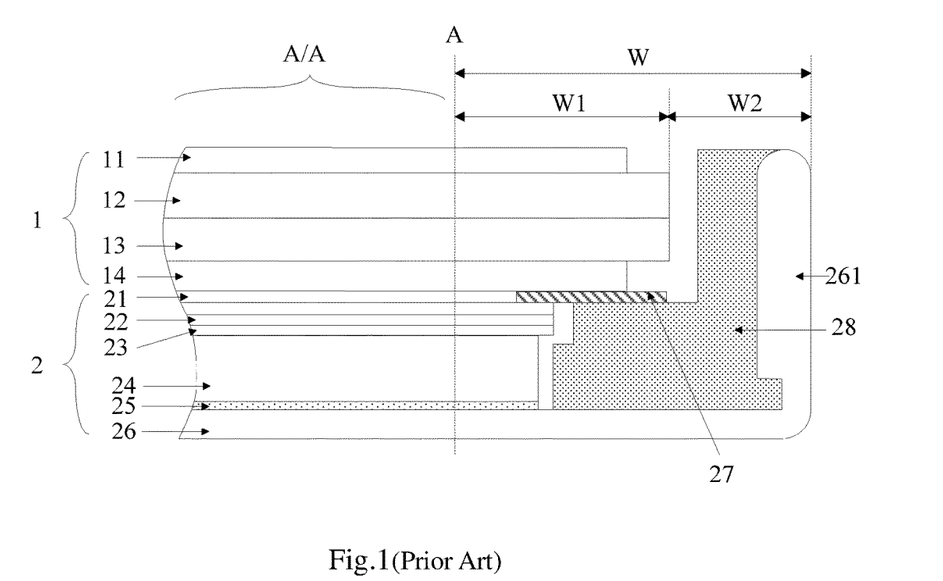
FIG. 1 is a structural schematic diagram of a liquid crystal display module in prior art.

All liquid crystal display devices in prior art include liquid crystal display modules. As shown in FIG. 1, a liquid crystal display module includes a display panel 1 and a backlight module 2. The liquid crystal display panel 1 comprises an upper polarizer 11, a color filter substrate 12, an array substrate 13 and a lower polarizer 14. The backlight module 2 comprises an upper prism 21, a lower prism 22, a scattering sheet 23, a light guide plate 24, a reflection sheet 25 and a rear (back) plate 26. The rear plate 26 has four barrier walls 261. A plastic frame (molding frame) 28 is provided on inner side of the barrier walls 261. A housing space is formed by the rear plate 26 and the barrier walls 261. The liquid crystal display panel 1 is arranged in the housing space, and is fixed on the plastic frame 28 by a double-sided adhesive tape 27.

However, a frame W of the liquid crystal display module in prior art is located outside a display region A/A. The frame W is mainly co-decided by both of a frame W1 of the liquid crystal display panel 1 and a frame W2 of the portion of the backlight module 2 beyond the liquid crystal display panel 1. Based on this structure, the frame of the liquid crystal display module can not be further reduced, which is not advantage to achieve a liquid crystal display product with a narrow frame.

SUMMARY

At least one embodiment of the invention provides a light guide plate comprising a light-guide-plate body and a protecting frame.

The light-guide-plate body comprises a light-exiting surface and a light-transmitting surface that are opposite to each other, and a plurality of side surfaces connecting the light-exiting surface with the light-transmitting surface.

The protecting frame comprises a vertical wall and a horizontal wall extending from the vertical wall to an inner side of the protecting frame, the horizontal wall comprises a first contact surface which is attached to an edge of the light-exiting surface, and the vertical wall comprises a second contact surface which is connected with the first contact surface, and the second contact surface is attached to the side surfaces of the light-guide-plate body.

At least one embodiment of the invention provides a backlight module comprising an optical component and a reflection sheet, and further comprising the above mentioned light guide plate. The light guide plate is arranged between the optical component and the reflection sheet.

At least one embodiment of the invention provides a liquid crystal display device comprising a liquid crystal display panel and further comprising the above mentioned backlight module. The backlight module and the liquid crystal display panel are fixed by a double-sided adhesive tape, one side of the double-sided adhesive tape is adhered to the liquid crystal display panel, the other side of the double-sided adhesive tape is adhered to at least the horizontal wall of the protecting frame of the backlight module, and a vertical projection of the liquid crystal display panel on the backlight module is within a range defined by the vertical wall of the protecting frame.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

First Embodiment

Figure 2:
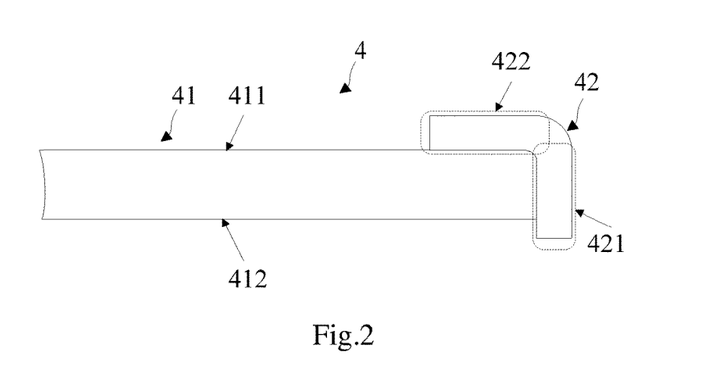
FIG. 2 is a cross section schematic diagram of a light guide plate provided by an embodiment of the invention.
Figure 3:
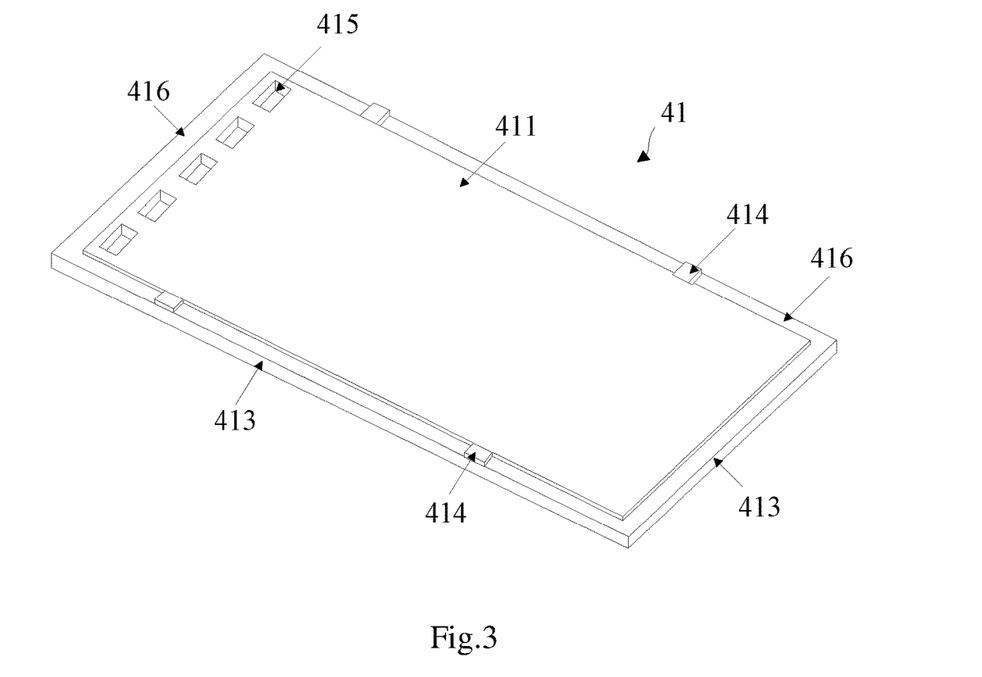
FIG. 3 is a stereoscopic schematic diagram of a light-guide-plate body provided by an embodiment of the invention.
Figure 4:
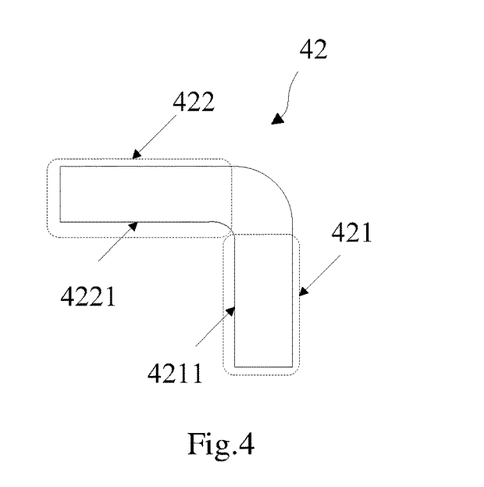
FIG. 4 is a cross section schematic diagram of a protecting frame provided by an embodiment of the invention along line A-A' of FIG. 5.
Figure 5:
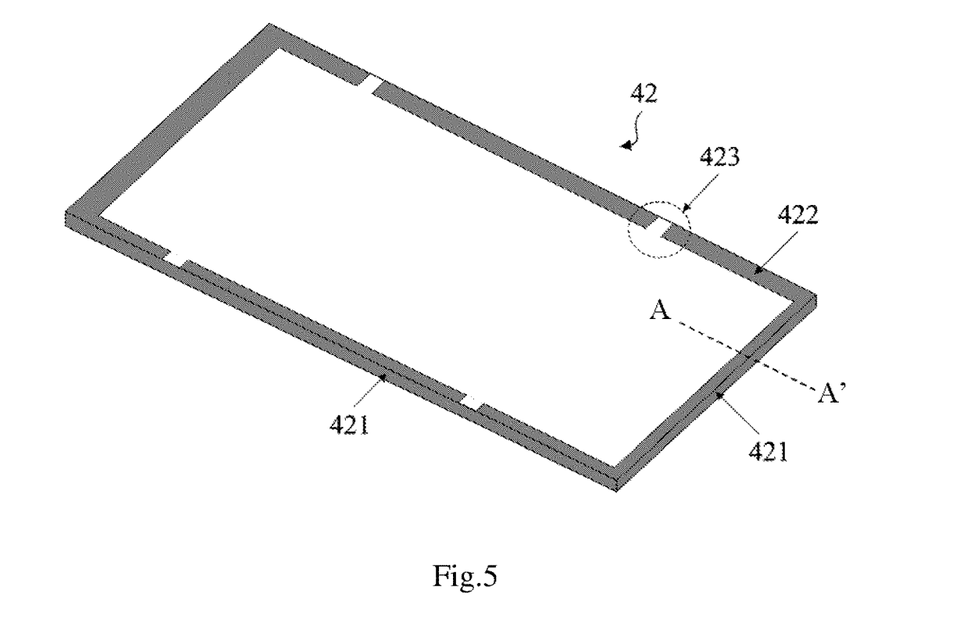
FIG. 5 is a stereoscopic schematic view of a protecting frame provided by an embodiment of the invention.

Referring to FIG. 2, the embodiment of the invention provides a light guide plate 4, which comprises a light-guide-plate body 41 and a protecting frame 42. The light-guide-plate body 41 comprises a light-exiting surface 411 and a light-transmitting surface 412 that are opposite to each other. The protecting frame 42 comprises a vertical wall 421 and a horizontal wall 422 extending from the vertical wall 421 to an inner side of the protecting frame 42. FIG. 3 is a stereoscopic schematic view of a light-guide-plate body 41. The light-guide-plate body 41 further comprises a plurality of side surfaces 413 connecting the light-exiting surface 411 with the light-transmitting surface 412. Referring to FIGS. 4 and 5, a protecting frame 42 comprises a vertical wall 421 and a horizontal wall 422 extending from the vertical wall 421 to an inner side of the protecting frame 42. The horizontal wall 422 comprises a first contact surface 4221 which is attached to an edge of the light-exiting surface 411. The vertical wall 421 comprises a second contact surface 4211 which is connected with the first contact surface 4221, and the second contact surface 4211 is attached to side surfaces 413 of the light-guide-plate body 41.

In the embodiment of the invention, a light guide plate has a protecting frame 42 which comprises a vertical wall 421 and a horizontal wall 422. The horizontal wall 422 is attached/fitted to a light-exiting surface 411 of the light-guide-plate body 41. The horizontal wall 422 can provide a position that the liquid crystal display is fixedly bonded to, and can protect the edge of the light-exiting surface 411 of the light-guide-plate body 41. The vertical wall 421 is attached/fitted to side surfaces 413 of the light-guide-plate body 41 and can protect the side surfaces 413 of the light-guide-plate body 41. In the event that the light guide plate with this structure is applied to a backlight module, the frame of the backlight module can be narrowed.

In order to make the light-guide-plate body 41 to match with the protecting frame 42 more tightly, structures may be as follows.

Referring to FIGS. 3 and 5, the edges of the light-exiting surface 411 have a plurality of protrusions 414. A plurality of openings 423 for matching with the plurality of protrusions 414 are provided on the first contact surface 4221 of the horizontal wall 422, and the openings 423 tightly match with the protrusions 414 on the light-exiting surface 411 respectively. In the embodiment of the invention, the horizontal wall 422 of the protecting frame tightly match with the edges of the light-guide-plate body 41 by the protrusions 414 and the openings 423, to make the light-guide-plate body 41 and the protecting frame 42 to be joined/combined more tightened.

Figure 6:
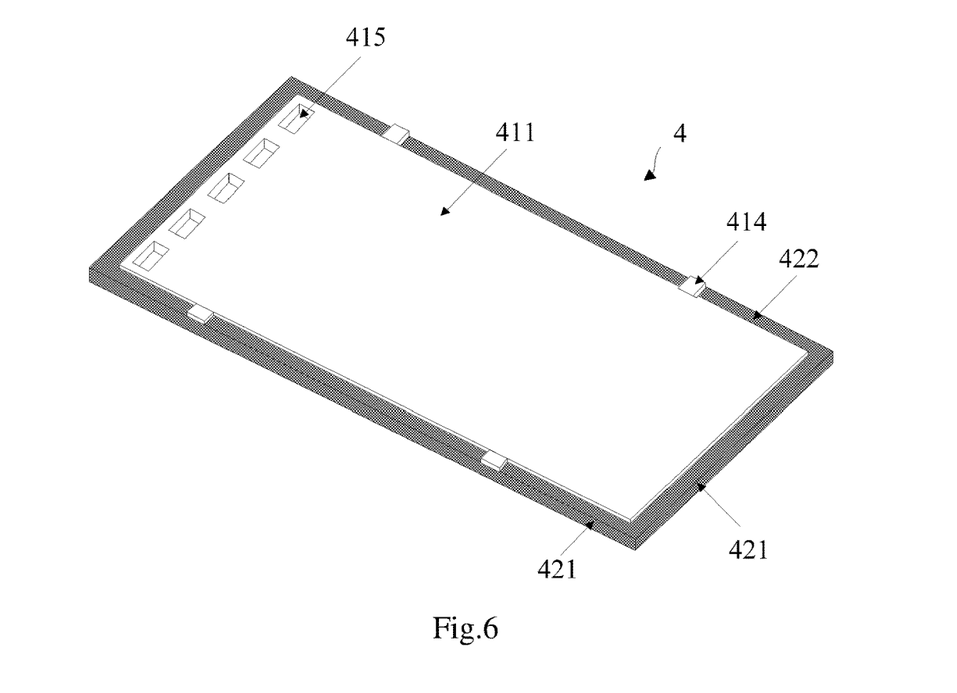
FIG. 6 is a stereoscopic schematic diagram of another light-guide-plate body provided by an embodiment of the invention.
Figure 7:
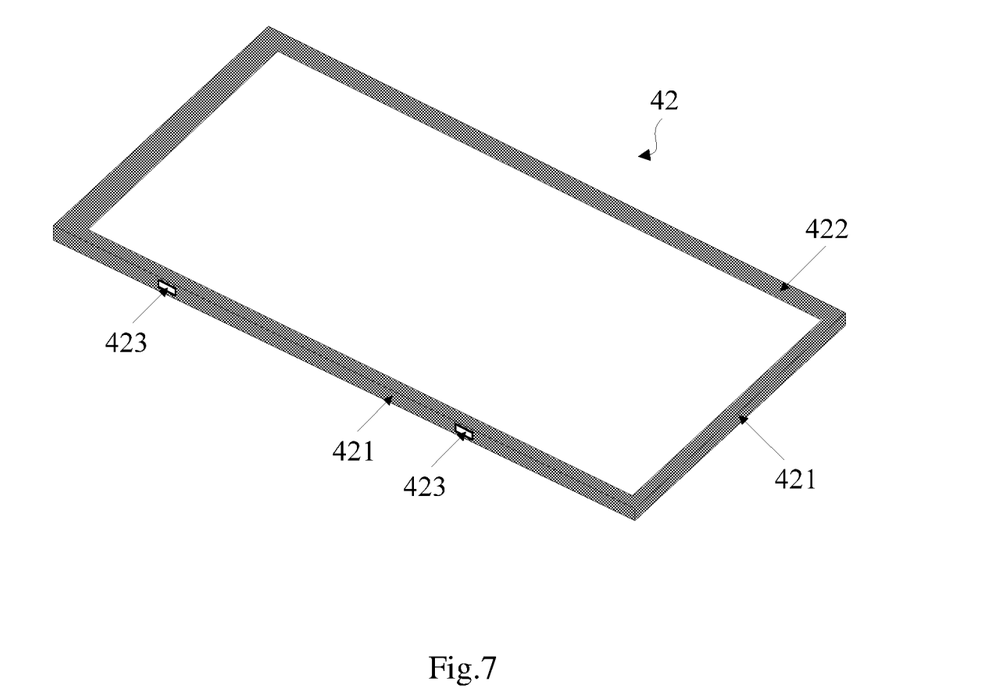
FIG. 7 is a stereoscopic schematic view of another protecting frame provided by an embodiment of the invention.

Referring to FIGS. 6 and 7, the side surfaces 413 have a plurality of protrusions 414. A plurality of openings 423 for matching with the plurality of protrusions 414 on the edges of the light-exiting surface 411 are provided on the second contact surface 4211 of the vertical wall 421, and the openings 423 are tightly attached to the protrusions 414 on the side surfaces 413 respectively. In the embodiment of the invention, the vertical wall 421 of the protecting frame 42 tightly match with the side surfaces 413 of the light-guide-plate body 41 by the protrusions 414 and the openings 423, to make the light-guide-plate body 41 and the protecting frame 42 to be joined/combined more tightened.

Of course, other tightly match/fitness manners can be adopted. For example, grooves are provided on the edge of the light-exiting surface 411 and protrusions are provided on the first contact surface 4221 of a horizontal wall 422, so that the protrusions tightly match with (fitted to) the grooves on the light-exiting surface 411. The light-guide-plate body 41 shown in FIGS. 3 and 6 and the protecting frame 42 shown in FIGS. 5 and 7 also can be combined and modified, to achieve the purpose of tight match/fitness, and the redundant portions will be omitted here.

Figure 8:
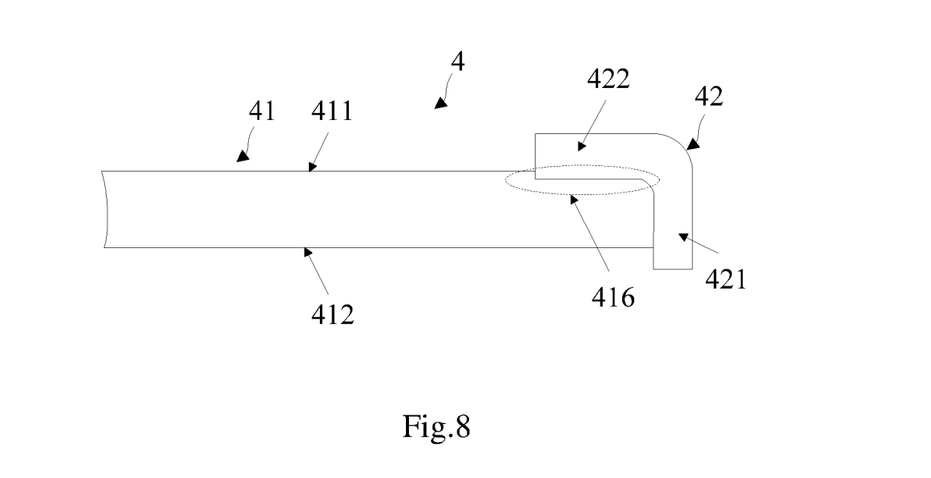
FIG. 8 is cross section schematic view of still another light guide plate provided by an embodiment of the invention.

Optionally, the edges of the light-exiting surface 411 comprise a recess 416, and the first contact surface 4221 of the horizontal wall 422 is attached to the recess 416. In the event that the light-exiting surface 411 has a recess 416, a cross section schematic view of a light guide plate 4 is shown in FIG. 8 (meanings of reference numerals of FIG. 8 are the same as those of FIG. 2). In the embodiment of the invention, the match/fitness can be more tightly when the horizontal wall 422 of the protecting frame 42 and the light-guide-plate body 41 are attached, and it is advantage to be positioned to each other.

Optionally, an extending length of a vertical wall 421 is larger than a thickness of a light-guide-plate body 41. In the embodiment of the invention, the vertical wall 421 has a reasonable extending length, so that the housing space defined by the vertical wall 421 can accommodate a reflection sheet better when a light guide plate match with a reflection sheet in subsequence process.

Optionally, a plurality of receiving spaces 415 for receiving light sources are further provided on a margin of a light-guide-plate body 41. The above mentioned margin can be a margin which is close to an end of the light guide plate, and also can be a position that is close to a plurality of sides of the light guide plate. For example, these receiving spaces are receiving grooves for receiving the light sources, or these receiving spaces are receiving holes for receiving the light sources or geometric spaces with other shapes which can receiving the light sources. In the embodiment of the invention, the light sources can be provided within the receiving spaces 415 of the light-guide-plate body 41. When this light guide plate is applied to a backlight module, the structure of the backlight module can be more compact in order to improve space utility.

Figure 9:
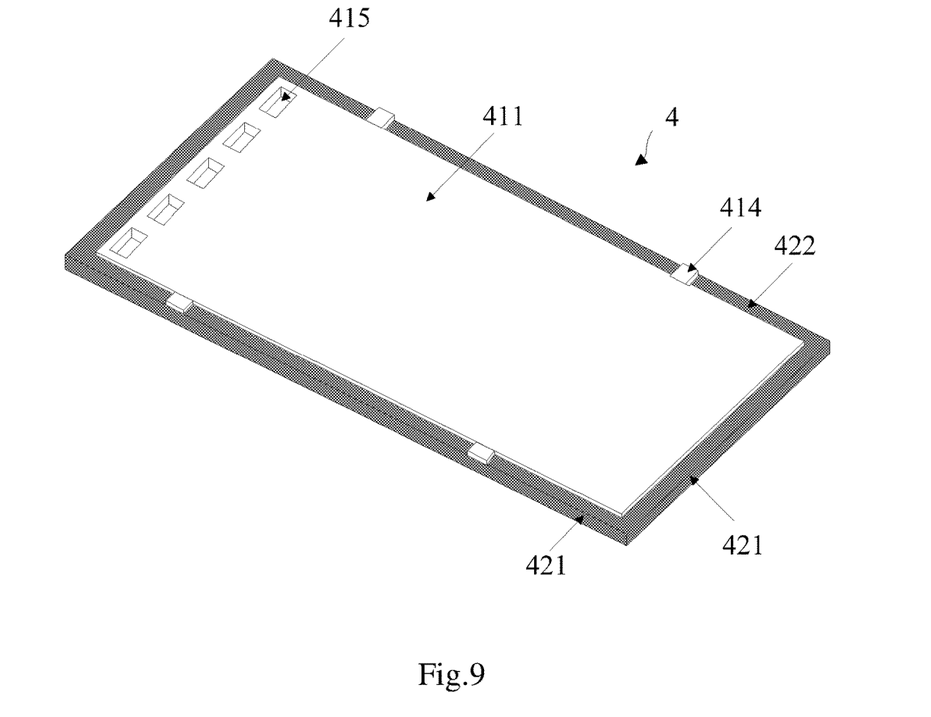
FIG. 9 is a stereoscopic schematic diagram of a light guide plate provided by an embodiment of the invention.

Based on the light-guide-plate body 41 shown in FIG. 3 and the protecting frame 42 shown in FIG. 5, FIG. 9 shows a stereoscopic schematic view of a light guide plate 4 joined/combined by the light-guide-plate body 41 and the protecting frame 42. The meanings of reference numerals of FIG. 9 are the same as those of FIGS. 3 and 5. A light guide plate joined/combined by the light-guide-plate body 41 shown in FIG. 6 and the protecting frame 42 shown in FIG. 7 has a similar structure with the light guide plate shown in FIG. 9, so redundant portions will be omitted here. It should be noted that the light-guide-plate body 41 and the protecting frame 42 can be assembled after being separately prepared, and also can be prepared by an integration preparing process.

Optionally, material of the light-guide-plate body 41 is methyl methacrylate. Material of the protecting frame 42 is solid metal, and this metal can be aluminum, iron or copper or the like which are easy to be molded.

Technical effects of embodiments of the invention are as follows: a light guide plate 4 has a protecting frame 42 and the protecting frame 42 comprises a vertical wall 421 and a horizontal wall 422; the horizontal wall 422 is attached to a light-exiting surface of the light-guide-plate body 41, configured to provide a position that a liquid crystal display panel is fixedly bonded to, and configured to protect the edge of the light-exiting of the light-guide-plate body 41; and the vertical wall 421 is attached to the side surfaces of the light-guide-plate body 41, so as to protect the side surfaces of the light-guide-plate body 41. In the event that the light guide plate with this structure is applied to a backlight module, the frame of the backlight module can be narrowed, which is advantageous to achieve a crystal liquid display panel with a narrow frame.

Second Embodiment

Figure 10:
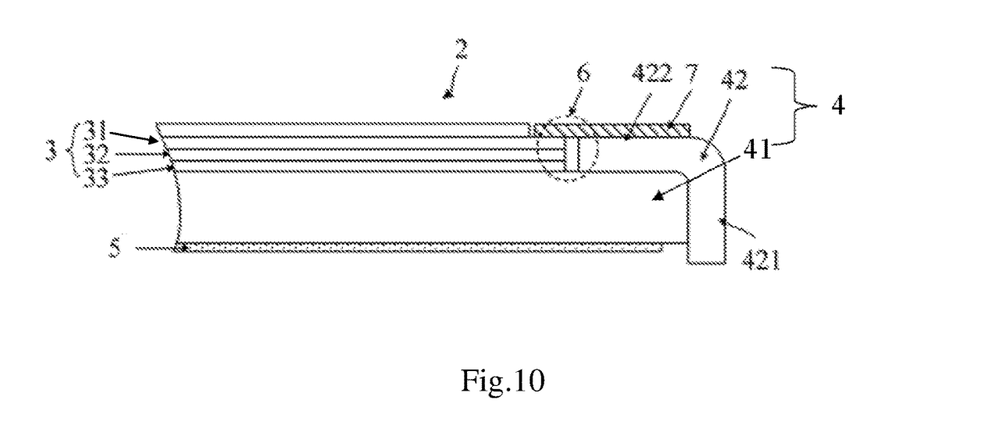
FIG. 10 is a cross section schematic view of a backlight module provided by an embodiment of the invention.

Referring to FIG. 10, the embodiment of the invention provides a backlight module 2, which comprises an optical component 3 and a reflection sheet 5, and further comprises the light guide plate 4 as provided by the above embodiment. The light guide plate 4 is arranged between the optical component 3 and the reflection sheet 5. The diagram of the light guide plate is shown in FIGS. 2 to 9.

Optionally, the light-transmitting surface 412 of the light-guide-plate body 41 is attached to a reflecting surface (unmarked) of the reflection sheet 5, and an end face of the vertical wall 421 of the protecting frame 42 is flushed/aligned with a bottom surface (unmarked) of the reflection sheet 5.

Optionally, the optical component 3 is attached to the light-exiting surface 411 of the light-guide-plate body 41, a gap 6 is configured/disposed between the optical component 3 and an end face of the horizontal wall 422 of the protecting frame 42, and a thickness of an edge of the optical component which is close to the horizontal wall 422 is same as a thickness of the horizontal wall 422.

The optical component 3 may comprise an upper prism group 31, a lower prism group 32 and a light scattering plate 33 etc. Repeated portions will be omitted here.

It should be noted that, usually when preparing a backlight module 2, a double-sided adhesive tape 7 is provided/disposed on a face/side of the backlight module predetermined toward to the liquid crystal display panel. An unused side of the double-sided adhesive tape is covered, and can be bonded to other parts in the event that the cover is removed in subsequent process. Repeated portions will be omitted here.

Technical effects of embodiments of the invention are as follows: a light guide plate 4 has a protecting frame 42 and the protecting frame 42 comprises a vertical wall 421 and a horizontal wall 422; the horizontal wall 422 is attached to a light-exiting surface of the light-guide-plate body 41, configured to provide a position that a liquid crystal display panel is fixedly bonded to, and configured to protect the edge of the light-exiting surface of the light-guide-plate body 41; and the vertical wall 421 is attached to the side surfaces of the light-guide-plate body 41, so as to protect the side surfaces of the light-guide-plate body 41. In the event that the light guide plate with this structure is applied to a backlight module, match/fitness of the light guide plate and the rear plate in the prior art can be replaced, the frame of the backlight module 2 is narrowed, which is advantageous to achieve a crystal liquid display panel with a narrow frame.

Third Embodiment

Figure 11:
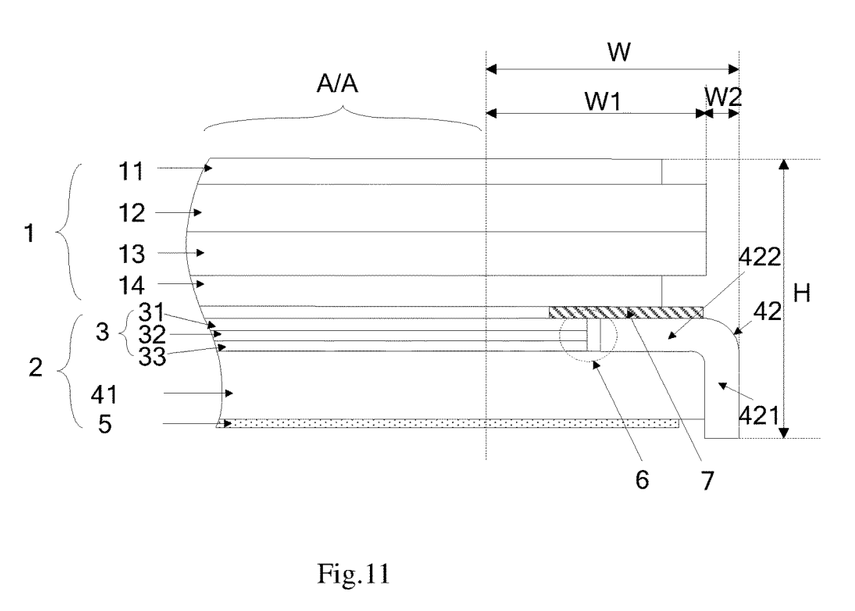
FIG. 11 is a cross section schematic view of a liquid crystal display module provided by an embodiment of the invention.

Referring to FIG. 11, the embodiment of the invention provides a liquid crystal display module, which comprises a liquid crystal display panel 1 and further comprises the backlight module 2 as provided by the second embodiment. The backlight module 2 and the liquid crystal display panel 1 are fixed by a double-sided adhesive tape 7. One side of the double-sided adhesive tape 7 is adhered to the liquid crystal display panel 1, and the other side of the double-sided adhesive tape is adhered to at least the horizontal wall 422 of the protecting frame 42 of the backlight module 2. A vertical projection of the liquid crystal display panel 1 on the backlight module 2 is within a range defined by the vertical wall 421 of the protecting frame 42.

The liquid crystal display panel 1 can comprise an upper light polarizer 11, a color filter substrate 12, an array substrate 13, a lower light polarizer 14 and liquid crystal (not shown) etc.

As shown in FIG. 11, a region outside a display region A/A is a frame W of a liquid crystal display module. The frame consists of a frame W1 of the liquid crystal display panel 1 and a frame W2 of the portion of the backlight module 1 beyond the crystal liquid display panel 1. Based on a design of the light guide plate 4 provided by the embodiment of the invention, this frame W2 of this portion is obviously narrower than that in prior art, so that the frame W of the liquid crystal display module can be narrowed.

Technical effects of embodiments of the invention are as follows: a light guide plate 4 has a protecting frame 42 and the protecting frame 42 comprises a vertical wall 421 and a horizontal wall 422; the horizontal wall 422 is attached to a light-exiting surface of the light-guide-plate body 41, configured to provide a position that a liquid crystal display panel is fixedly bonded to, and configured to protect the edge of the light-exiting surface of the light-guide-plate body 41; and the vertical wall 421 is attached to the side surfaces of the light-guide-plate body 41, so as to protect side surfaces of the light-guide-plate body 41. In the event that a light guide plate with this structure is applied to a backlight module, match/fitness of the light guide plate and the rear plate in the prior art can be replaced, the frame of the backlight module is narrowed, which is advantageous to achieve a crystal liquid display module with a narrow frame.

Fourth Embodiment

The embodiment of the invention provides a liquid crystal display device, which comprises the liquid crystal display module as provided by the third embodiment. In the embodiment of the invention, the light guide plate has the protecting frame and the protecting frame comprises the vertical wall and the horizontal wall. The horizontal wall is attached to the light-exiting surface of the light-guide-plate body, configured to provide a position that a liquid crystal display panel is fixedly bonded to, and configured to protect the edge of the light-exiting of the light-guide-plate body. The vertical wall is attached to the side surfaces of the light-guide-plate body, so as to protect the side surfaces of the light-guide-plate body. In the event that a light guide plate with this structure is applied to a backlight module, the frame of the backlight module can be narrowed, and a crystal liquid display product with a narrow frame can be produced.

The abovementioned embodiments are only exemplary examples of the invention, not limiting the protecting scope of the invention. The protecting scope of the invention is determined by the appended claims.

This application claims the benefit of priority from Chinese patent application No. 201410729178.X, filed on Dec. 3, 2014, the disclosure of which is incorporated herein in its entirety by reference as a part of the present application.

The invention claimed is:

1. A light guide plate, comprising: a light-guide-plate body and a protecting frame, wherein
  the light-guide-plate body comprises a light-exiting surface and a light-transmitting surface that are opposite to each other, and a plurality of side surfaces connecting the light-exiting surface with the light-transmitting surface;
  the protecting frame comprises a vertical wall and a horizontal wall extending from the vertical wall to an inner side of the protecting frame, the horizontal wall comprises a first contact surface which is attached to an edge of the light-exiting surface, and the vertical wall comprises a second contact surface which is connected with the first contact surface, and the second contact surface is attached to the side surfaces of the light-guide-plate body; and
  the edge of the light-exiting surface comprises a recess, and the first contact surface of the horizontal wall is attached to the recess.

2. The light guide plate according to claim 1, wherein the edge of the light-exiting surface has a plurality of protrusions, a plurality of openings for matching with the plurality of protrusions are provided on the first contact surface of the horizontal wall, and the openings tightly match with the protrusions.

3. The light guide plate according to claim 2, wherein an extending length of the vertical wall is larger than a thickness of the light-guide-plate body.

4. The light guide plate according to claim 2, wherein a plurality of receiving spaces for receiving light sources are further provided on a margin of the light-guide-plate body, and the receiving spaces are located at the inner side of the protecting frame.

5. The light guide plate according to claim 1, wherein the side surfaces have a plurality of protrusions, a plurality of openings for matching with the plurality of protrusions on the side surfaces are provided on the second contact surface of the vertical wall, and the openings tightly match with the protrusions.

6. The light guide plate according to claim 5, wherein an extending length of the vertical wall is larger than a thickness of the light-guide-plate body.

7. The light guide plate according to claim 5, wherein a plurality of receiving spaces for receiving light sources are further provided on a margin of the light-guide-plate body, and the receiving spaces are located at the inner side of the protecting frame.

8. The light guide plate according to claim 1, wherein an extending length of the vertical wall is larger than a thickness of the light-guide-plate body.

9. The light guide plate according to claim 1, wherein a plurality of receiving spaces for receiving light sources are further provided on a margin of the light-guide-plate body, and the receiving spaces are located at the inner side of the protecting frame.

10. The light guide plate according to claim 1, wherein material of the light-guide-plate body is methyl methacrylate.

11. The light guide plate according to claim 1, wherein material of the protecting frame is solid metal.

12. A backlight module, comprising an optical component and a reflection sheet, and further comprising the light guide plate according to claim 1,
wherein the light guide plate is arranged between the optical component and the reflection sheet.

13. The backlight module according to claim 12, wherein the light-transmitting surface of the light-guide-plate body is attached to a reflecting surface of the reflection sheet, and an end face of the vertical wall of the protecting frame is flush with a bottom surface of the reflection sheet.

14. The backlight module according to claim 13, wherein the optical component is attached to the light-exiting surface of the light-guide-plate body, a gap is configured between the optical component and an end face of the horizontal wall of the protecting frame, and a thickness of an edge of the optical component which is close to the horizontal wall is same as a thickness of the horizontal wall.

15. The backlight module according to claim 12, wherein the optical component is attached to the light-exiting surface of the light-guide-plate body, a gap is configured between the optical component and an end face of the horizontal wall of the protecting frame, and a thickness of an edge of the optical component which is close to the horizontal wall is same as a thickness of the horizontal wall.

16. A liquid crystal display device, comprising a liquid crystal display panel and further comprising the backlight module according to claim 12,
wherein the backlight module and the liquid crystal display panel are fixed by a double-sided adhesive tape, one side of the double-sided adhesive tape is adhered to the liquid crystal display panel, the other side of the double-sided adhesive tape is adhered to at least the horizontal wall of the protecting frame of the backlight module, and a vertical projection of the liquid crystal display panel on the backlight module is within a range defined by the vertical wall of the protecting frame.

17. The light guide plate according to claim 1, wherein an extending length of the vertical wall is larger than a thickness of the light-guide-plate body.

* * * * *